(12) United States Patent
Wilczek

(10) Patent No.: US 11,989,734 B2
(45) Date of Patent: May 21, 2024

(54) REAL-TIME TRANSACTION RISK ANALYSIS VIA BLENDED HISTORY

(71) Applicant: Coupa Software Incorporated, San Mateo, CA (US)

(72) Inventor: Donna Wilczek, Sonoma, CA (US)

(73) Assignee: Coupa Software Incorporated, San Mateo, CA (US)

( * ) Notice: Subject to any disclaimer, the term of this patent is extended or adjusted under 35 U.S.C. 154(b) by 0 days.

(21) Appl. No.: 17/483,094

(22) Filed: Sep. 23, 2021

(65) Prior Publication Data

US 2022/0020028 A1 Jan. 20, 2022

Related U.S. Application Data

(63) Continuation of application No. 17/373,504, filed on Jul. 12, 2021, now abandoned.

(60) Provisional application No. 63/051,811, filed on Jul. 14, 2020.

(51) Int. Cl.
*G06Q 20/40* (2012.01)
*G06F 16/245* (2019.01)
*G06Q 10/0631* (2023.01)
*G06Q 30/0601* (2023.01)

(52) U.S. Cl.
CPC ....... *G06Q 20/4016* (2013.01); *G06F 16/245* (2019.01); *G06Q 10/06313* (2013.01); *G06Q 30/0605* (2013.01)

(58) Field of Classification Search
CPC .............. G06Q 20/4016; G06Q 10/0635
See application file for complete search history.

(56) References Cited

U.S. PATENT DOCUMENTS

| | | | | |
|---|---|---|---|---|
| 6,714,915 | B1 * | 3/2004 | Barnard | G06Q 10/06316 705/7.13 |
| 8,682,703 | B2 * | 3/2014 | Britton | G06Q 10/06 705/7.12 |
| 2002/0103731 | A1 * | 8/2002 | Barnard | G06Q 10/063112 705/34 |

(Continued)

OTHER PUBLICATIONS

Stephens et al, Security of E-Procurement Transactions in Supply Chain Reengineering, Computer and Information Science; vol. 6, No. 3; 2013 (Year: 2013).*

*Primary Examiner* — Andre D Boyce
(74) *Attorney, Agent, or Firm* — Baker Botts L.L.P.

(57) ABSTRACT

In an embodiment, a computer-implemented method, comprises receiving transaction data for a plurality of transactions; identifying, from transaction data for a particular transaction of the plurality of transactions, an associated project of the particular transaction and project parameters of the associated project; performing, based on the transaction data for the particular transaction and the project parameters of the associated project, a risk assessment of the associated project of the particular transaction; performing an action in response to the risk assessment, the action comprising at least one of: generating a digital alert to a buyer and/or supplier account; preventing completion of the particular transaction; preventing access to private data; anonymizing private data; or creating a hold on the associated project to prevent completion of one or other associated transactions.

10 Claims, 4 Drawing Sheets

(56) References Cited

U.S. PATENT DOCUMENTS

| | | | | |
|---|---|---|---|---|
| 2002/0174050 | A1* | 11/2002 | Eynard | G06Q 40/04 |
| | | | | 705/37 |
| 2004/0083165 | A1* | 4/2004 | Lawrence | G06Q 40/06 |
| | | | | 705/38 |
| 2004/0148190 | A1* | 7/2004 | Barnard | G06Q 10/063114 |
| | | | | 705/348 |
| 2004/0267595 | A1* | 12/2004 | Woodings | G06Q 10/06 |
| | | | | 705/7.14 |
| 2006/0059253 | A1* | 3/2006 | Goodman | G06Q 10/10 |
| | | | | 709/223 |
| 2006/0074729 | A1* | 4/2006 | Capotosto | G06Q 10/087 |
| | | | | 705/7.12 |
| 2006/0074789 | A1* | 4/2006 | Capotosto | G06Q 50/28 |
| | | | | 705/35 |
| 2008/0312979 | A1* | 12/2008 | Lee | G06Q 10/0635 |
| | | | | 705/7.39 |
| 2009/0043622 | A1* | 2/2009 | Finlayson | G06Q 10/06315 |
| | | | | 705/7.22 |
| 2010/0023918 | A1* | 1/2010 | Bernardini | G06Q 30/0611 |
| | | | | 717/101 |
| 2010/0138354 | A1* | 6/2010 | Lawrence | G06Q 40/08 |
| | | | | 705/317 |
| 2012/0278205 | A1* | 11/2012 | Chin | G06Q 10/087 |
| | | | | 705/28 |
| 2018/0218456 | A1* | 8/2018 | Kolb | G06Q 30/08 |

* cited by examiner

REAL-TIME TRANSACTION RISK ANALYSIS VIA BLENDED HISTORY

BENEFIT CLAIM

This application claims the benefit under 35 U.S.C. 120 as a Continuation of application Ser. No. 17/373,504, filed Jul. 12, 2021, now abandoned, which claims the benefit under 35 U.S.C. 119 of provisional application 63/051,811, filed Jul. 14, 2020, the entire contents of which are hereby incorporated by reference for all purposes as if fully set forth herein.

TECHNICAL FIELD

One technical field of the present disclosure is distributed computer systems in the field of electronic procurement including computer-implemented processes for securely receiving and viewing sensitive transaction data. Another technical field is distributed computer systems programmed to block or allow transactions based on the real-time risk assessment of transactions based on project parameters.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

E-procurement (or electronic procurement) may involve digital or electronic marketplaces where buyers and suppliers interact digitally to participate in the exchange of goods and services for financial compensation. E-procurement may involve interaction between a buyer and supplier (or seller) through an intermediary service, such as a software platform. E-procurement may also involve interaction between an individual user or group of individual users and a system facilitating the filing, recording, execution and tracking of transactions by buyers and suppliers. As one example, procurement refers to a process whereby a buyer member of an organization submits a requisition, or purchase order, to obtain an item or service from a supplier. These procurements utilize a third-party intermediary service to allow communication between buyers and suppliers and to handle the exchange of financial compensation and provide logistic information to fulfill the requisition.

E-procurement systems have helped to facilitate procurement by managing transactional data processing tasks, including creating, storing, and managing data and communications related to procurement transactions between entities on a network. In a networked e-procurement system, the users of multiple different entity computers across the network create and store data in the system at the same time or at different times using different instances of procurement software.

E-procurement systems have provided opportunities for large-scale management of transactions in real-time. E-procurement systems and software may connect many hundreds of buyers and their individual users with millions of suppliers and their users to manage trillions of dollars in transactions. Such large-scale, real-time transaction management, however, encounters unique challenges, such as in assessing risk across a large volume of transactions and through various stages of transactions.

Generally, transaction risk assessment has been performed as a stand-alone process that may use data from or provide data to an e-procurement system but is not otherwise well integrated with the e-procurement system and may be largely human-determined. Further, administrators of the system generally manually resolve potential risk issues. For example, a system administrator may assess a supplier to identify risk factors before approving the supplier to provide goods or services via an e-procurement system. A system administrator may further perform periodic risk assessment of an approved supplier, such as when a buyer raises a potential issue with the supplier, for the approved supplier to maintain good standing to continue providing goods or services via the e-procurement system. Similarly, a buyer may perform a risk assessment at an initial sourcing stage for a project before approving one or more suppliers for a given transaction or project, and may perform periodic future risk assessments, such as when changes are made to project parameters. A buyer or supplier may also want to analyze the transactional behavior of their own users to ensure compliance with project parameters through the end-to-end process, over similar transaction paths.

SUMMARY OF THE INVENTION

The appended claims may serve as a summary of the invention.

DETAILED DESCRIPTION

Figure 1:
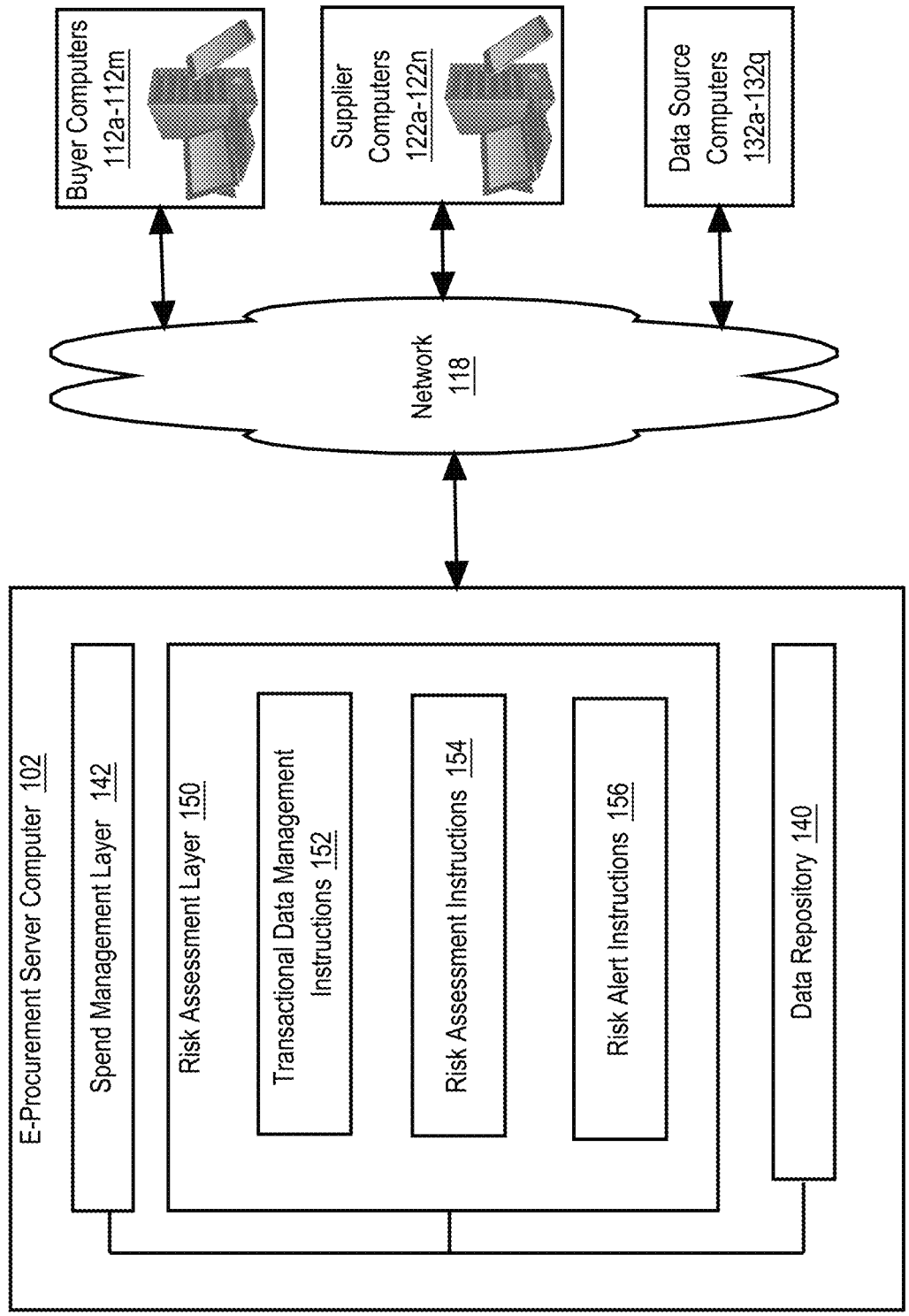
FIG. 1 illustrates a networked computer system according to an embodiment.

In the following description, for the purposes of explanation, numerous specific details are set forth in order to provide a thorough understanding of the present disclosure. It will be apparent, however, that the present disclosure may be practiced without these specific details. In other instances, well-known structures and devices are shown in block diagram form in order to avoid unnecessarily obscuring the present disclosure. Embodiments are described according to the following outline:

1. GENERAL OVERVIEW
2. EXAMPLE COMPUTING ENVIRONMENTS AND COMPUTER COMPONENTS
3. EXAMPLE PROCESSES FOR ASSESSING RISK IN E-PROCUREMENT TRANSACTIONS
4. HARDWARE AND SOFTWARE OVERVIEW
5. GENERAL CONSIDERATIONS

1. General Overview

The present disclosure provides computer-implemented techniques for assessing risk across e-procurement transactions and performing computer-implemented actions to address risk issues in response to the risk assessments. The risk assessment techniques enable active, automated, programmatic examination of transactions to assess risk issues. Further, the risk assessment techniques are programmed for viewing and examining transaction data in real-time as transaction data are received by an e-procurement system or application. The techniques are configured to examine such real-time transaction data for all transactions through an e-procurement system or application. Such transactions include, for instance, digital electronic requisitions, purchase orders, payments, sourcing events, invoicing, and the like. The real-time transaction data also captures data throughout various stages of a transaction, such as from a project definition stage, a contract or agreement negotiation stage, a transaction request and approval stage, an invoicing stage, and a payment stage.

According to an embodiment, the risk assessment techniques are programmed to analyze transaction data to assess risk on a project basis. A given project, for example, such as a sourcing event for acquiring computer hardware and/or software for a new office location, may ultimately include numerous separate transactions. The disclosed techniques enable programmatic risk analysis throughout a history of the numerous separate transactions to assess risk associated with the project and/or manage the scope of the overall project. More particularly, the techniques are programmed to identify one or more projects associated with a particular transaction, and use associated project criteria or parameters, and transaction data for the particular transaction to assess project risk. Project parameters include, for example, use of or access to customer data or other private information, spend parameters related to authorized monetary amounts and/or authorized quantities of goods and/or services, timing requirements for delivery of goods or performance of services, and the like.

Based at least in part on the risk assessment, a computer-implemented action or measure may be executed, such as, an e-procurement service creating an actionable flag, performing a gating control, or create a review process for a given individual interacting with the system. More particularly, the computer-implemented action may include one or more of generating a digital alert to a buyer and/or supplier account, preventing completion of a transaction or otherwise placing a hold on the transaction, placing a hold on the transaction pending further risk evaluation, preventing access to private data, anonymizing private data and allowing a particular transaction to proceed, or creating a hold on a project to prevent completion of one or other transactions associated with the project. Thus, based on risk values and project parameters, particular transactions can be blocked or allowed, using method calls, method invocations, messages or other programmatic techniques.

According to an embodiment, the risk assessment techniques are programmed to determine a scale or severity of a violation of project parameters and determine a computer-implemented action to perform based, at least in part, on the determined scale or severity of the violation. For instance, an alert may be generated for a transaction when an actual spend amount specified in the transaction is within a predetermined percentage of an authorized spend amount, while a hold may be created on a project when an actual spend amount of one or more transactions exceeds the authorized spend amount by a predetermined percentage or amount. In another example, an alert may be generated, or a hold created if a particular transaction shares private data.

2. Example Computing Environments and Computer Components

FIG. 1 illustrates an example networked computer system with which various embodiments may be practiced. FIG. 1 is shown in simplified, schematic format for purposes of illustrating a clear example and other embodiments may include more, fewer, or different elements. FIG. 1 illustrates data elements that may be created and managed under programmatic control to implement one embodiment. FIG. 1, and the other drawing figures and all of the description and claims in this disclosure, are intended to present, disclose and claim a technical system and technical methods in which specially programmed computers, using a special-purpose distributed computer system design, execute functions that have not been available before to provide a practical application of computing technology to the problem of risk assessment in e-procurement systems based on blended transaction data. In this manner, the disclosure presents a technical solution to a technical problem, and any interpretation of the disclosure or claims to cover any judicial exception to patent eligibility, such as an abstract idea, mental process, method of organizing human activity or mathematical algorithm, has no support in this disclosure and is erroneous.

In some embodiments, the networked computer system comprises an e-procurement server computer 102 ("server"), one or more supplier computers 122a-122n, one or more buyer computers 112a-112m, and one or more data source computers 132a-132q, which are communicatively coupled directly or indirectly via one or more networks 118. The designation "122a-122n" indicates that any number of supplier or seller computers may be used in various embodiments. The designation "112a-112m" indicates that any number of buyer computers may be used in various embodiments. The designation "132a-132q" indicates that any number of data source computers may be used in various embodiments.

In one embodiment, e-procurement server computer 102 is communicatively coupled to a project database, a transaction database, a plurality of buyer computers and a plurality of seller computers via the one or more networks. The project database is loaded with a plurality of records, each of the records comprising a project identifier configured as a database key value and specifying a plurality of project parameters, the project parameters specifying use of or access to customer data or other private information, spend parameters related to authorized monetary amounts and/or authorized quantities of goods and/or services, timing requirements for delivery of goods or performance of services. A particular project may comprise a sourcing event being defined by buyer entity, a start date, an end date, one or more commodities, and one or more points of delivery of the commodities. As a concrete example, a project may be named "Reopening of Alpha Office" and could have a spend parameter of "USD$100,000" and a time range of "January to March" of a particular year. Such a project would represent all enterprise spending associated with reopening an office for the purpose of tracking multiple later procurement transactions relating to the reopening project.

Loading can comprise writing records to the project database as projects are defined; write operations to load records can be programmatic, via calls from other programs or services, or can be initiated manually using a user interface to the project database and writing data in tables or rows.

The server 102 can programmatically access the project database, for example, by transmitting queries in SQL, non-SQL query formats, or application-specific formats using method calls, remote procedure calls, or other functional invocations. The server 102 is programmed for obtaining, from the transaction database, transaction data for a plurality of e-procurement transactions in real time as the transaction data is entered in the transaction database during transactions between the buyer computers and the supplier computers. Transactions can be electronic records, such as database rows or other records, which associate multiple digital data values that represent requisitions, purchase orders, invoices, or payments.

In some embodiments, the server 102 broadly represents one or more computers, such as a server farm, a cloud computing platform, or a parallel computer, virtual computing instances, and/or instances of a server-based application. The server 102 comprises a spend management layer 142 that is programmed or configured to host or execute functions including but not limited to managing buyer accounts associated with the one or more buyer computers 112a-112m, managing supplier accounts associated with the one or more supplier computers 122a-122n, and facilitating generation and maintenance of digital documents during procurement transactions between buyer accounts and supplier accounts, such as catalogs, purchase requisitions, purchase orders, or invoices. The server 102 also comprises a risk assessment layer 150 comprising machine instructions that are programmed or configured to host or execute functions including but not limited to evaluating transactions in real-time and in view of project risk parameters, and reporting potential issues and/or providing gating controls based on the risk evaluation or assessment. Thus, rather than comprising a general-purpose computer, the server 102 is programmed or configured with stored program instructions to operate as a special-purpose machine to execute the functions and operations that are further described herein.

FIG. 1 also illustrates example components of the server 102 in accordance with the disclosed embodiments. Each of the functional components can be implemented as one or more sequences of executable stored program instructions, other software components, general or specific-purpose hardware components, firmware components, or any combination thereof. A storage component can be implemented using any of relational databases, object databases, flat file systems, or JSON stores. A storage component can be connected to the functional components locally or through the networks using programmatic calls, remote procedure call (RPC) facilities or a messaging bus. A component may or may not be self-contained. Depending upon implementation-specific or other considerations, the components may be centralized or distributed functionally or physically.

In some embodiments, the risk assessment layer 150 can comprise computer-executable instructions, including transactional data management instructions 152, risk assessment instructions 154, and risk alert instructions 156. In addition, the server 102 can comprise a database repository 140.

In some embodiments, the transactional data management instructions 152 are programmed to enable collecting and transmitting transactional data or documents, such as catalogs, purchase requisitions, purchase orders, invoices, payments, payment account information, and new or amended contracts. In an example, the transactional data management instructions 152 are programmed to enable managing the transactional data by semantic units, such as individual item descriptions or prices. For example, a catalog retrieved from a supplier computer can be parsed into these semantic units, or a graphical user interface can be presented for entering or selecting such semantic units in generating a purchase requisition. Additional metadata that may not be part of the transactional data can also be stored with the transactional data, such as the date of creation or the list of accounts accessing the transactional data.

In some embodiments, the risk assessment instructions 154 are programmed for identifying and evaluating violations of project parameters or other triggering events in response to real-time analysis of transaction data through an e-procurement system. For example, the risk assessment instructions are programmed to execute receiving transaction data, identifying a corresponding project for a given transaction, identifying other transactions for the corresponding project, evaluating risk based on project parameters and transaction data for a given transaction and for other related transactions. The project parameters relate to a scope of a project including, for instance, an authorized spend amount and identification of customer, policy parameters, or other private data. The risk assessment instructions 154 further are programmed to determine whether project parameters are violated and to determine a significance or scale of a violation of project parameters.

In some embodiments, the risk alert instructions 156 are programmed to execute precautionary or remedial measures for at least some violations of risk parameters triggered by one or more transactions. Example precautionary or remedial measures include sending an alert to a buyer computer of a buyer account, sending an alert to a supplier computer of a supplier account, blocking a payment from the buyer account to the supplier account, blocking access to or anonymizing private data, or initiating additional risk assessment for other transactions and/or projects of buyer or seller accounts.

In one example embodiment, risk alert instructions 156 are programmed to detect that an employee, who has a combined history of entering expense reports up to the very limit of business spend policies, as well as a history of submitting purchase requisitions up to the business' spend approval limits. Taken separately, these scenarios may not be flagged as a violation of risk parameters, but together the actions would generate a risk alert for the employee. In this case, based on risk assessment instructions 154, a risk alert instruction 156 may be triggered. In one embodiment, a set of risk assessment instructions 154 may be configured to periodically execute based on a time-based job scheduler such as a cron job. Each employee or user account may be assigned an employee ID or account ID, and for each employee ID, the risk alert assessment instructions 154 may be programmed to retrieve each expense report record associated with the employee ID. The risk alert assessment instructions 154 may then determine the total reimbursement amount reflected in the record and test whether that amount is within 10% of the previously configured approved business spend limit maximum. If the 10% business spend maximum is reached, then a computer-implemented risk alert instruction 156 may be triggered to flag the transaction. In this description 10% is an example threshold value or trigger value and other embodiments may use other values, or the specific value may be read from a configuration file or configuration table.

The risk alert instructions 156 are configured to perform computer-implemented measures depending on a scale or severity of a violation of project parameters. For instance, if a spend amount is approaching a threshold percentage of an authorized spend amount specified in the project parameters for a particular project (e.g., a cumulative spend amount across one or more transactions of a project is within 10% of the authorized spend amount for the project) the risk alert instructions 156 may flag one or more transactions and/or the project to provide an alert to a corresponding account, and/or to flag the transaction(s) and/or project for additional risk review. In one embodiment, the risk alert instructions 156 may be programmed to count the number of flag values that are set in all records within a specified past time range, such as three months before the cron job or other scheduled job initiated execution. If greater than three (3) flags are found within that time range, then the risk alert instruction 156 may be programmed to record the employee ID in association with the security flag in an employee security table. The risk alert instructions 156 may be programmed, after processing all employee IDs or account IDs in the foregoing manner, to read the employee security table and, for each record in which a security flag is set, to transmit a notification to another account of a supervisor associated with the account ID or employee ID.

In another example, if a cumulative spend amount exceeds an authorized spend amount for a project, the risk alert instructions 156 may hold, suspend, block, or prevent one or more transactions from proceeding to payment or execution. In a further example, if a transaction shares or accesses customer data or other private data, the risk alert instructions 156 may cause transmitting an alert message or other notification, via the network, to a corresponding account and/or can mark the transaction in the database of the e-procurement system to prevent the transaction from proceeding.

In some embodiments, the database repository 140 is programmed or configured to manage relevant data structures and store relevant data for functions performed by the server 102. In association with the risk assessment layer 150, the data may include project parameters including, for instance, project identifiers, authorized spend limits, authorized quantity limits, privacy controls over customer and other data, supplier entity data, buyer entity data, transactional data including payment terms, trends of prices or charges, risk assessment results, risk alerts, delivery timing trends, and the like.

In some embodiments, each of the buyer computers 112a-112m broadly represents one or more computers, virtual computing instances, and/or instances of an e-procurement application program that are associated with an institution or entity that is related as a buyer with respect to a separate entity associated with one of the supplier computers 122a-n. A buyer computer 112 is programmed to create a buyer account with the server 102 and manage digital documents related to a buyer account during procurement transactions, such as receiving a catalog of items for sale from the server 102, generating or transmitting a purchase requisition or purchase order for some of the items for sale to the server 102, or receiving an invoice for some of the items for sale from the server 102.

The buyer computer 112 may comprise a desktop computer, laptop computer, tablet computer, smartphone, wearable device, or any other type of computing device that is capable of proper communication with the server 102 as well as adequate local data processing and storage. In some cases, a buyer computer 112 may be a personal computer or workstation that hosts or executes a browser and communicates via HTTP and HTML over the network 118 with a server-side e-procurement application hosted or executed at the server 102. In other cases, a buyer computer 112 may be a server-class computer and/or virtual computing instance that hosts or executes an instance of an e-procurement application that communicates programmatically via API calls, RPC or other programmatic messaging with the server 102.

Similarly, in some embodiments, each supplier computer 122 broadly represents one or more computers, virtual computing instances, and/or instances of an e-procurement application program that are associated with an institution or entity that is related as a supplier with respect to a separate entity associated with the buyer computer 112. A supplier computer 122 is programmed to create a supplier account with the server 102 and manage digital documents related to a supplier account during procurement transactions, such as generating or transmitting a catalog of items for sale to the server 102, receiving a purchase order for some of the items for sale from the server 102, or generating or transmitting an invoice for some of the items for sale to the server 102.

A supplier computer 122 may comprise a desktop computer, laptop computer, tablet computer, smartphone, wearable device, or any other type of computing device that is capable of proper communication with the server as well as adequate local data processing and storage. In some cases, a supplier computer 122 may be a personal computer or workstation that hosts or executes a browser and communicates via HTTP and HTML over network 118 with a server-side e-procurement application hosted or executed at the server 102. In other cases, a supplier computer 122 may be a server-class computer and/or virtual computing instance that hosts or executes an instance of an e-procurement application that communicates programmatically via API calls, RPC or other programmatic messaging with the server 102.

In some embodiments, each data source computer 132 broadly represents one or more computers, virtual computing instances, and/or instances of a data management application program with a communication interface. A data source computer 132 is programmed to manage one or more data sources, receive a request for certain data in the one or more data sources from the server 102, and send a response to the request to the server 102. The data source computer 132 can comprise any computing facility with sufficient computing power in data processing, data storage, and network communication for the above-described functions.

In some embodiments, the network 118 may be implemented by any medium or mechanism that provides for the exchange of data between the various elements of FIG. 1. Examples of the network 118 include, without limitation, one or more of a cellular network, communicatively coupled with a data connection to the computing devices over a cellular antenna, a near-field communication (NFC) network, a Local Area Network (LAN), a Wide Area Network (WAN), the Internet, a terrestrial or satellite link, etc.

In some embodiments, through the risk assessment layer 150, the server 102 is programmed to receive or store transactional data, such as catalogs, purchase requisitions, purchase orders, or invoices, from or to the buyer computers 112 or the supplier computers 122. In other embodiments, the server 102 is programmed to receive or transmit additional transactional data, such as expense reports, from or to one of the buyer computers 112 representing an organization and another one of the buyer computers 112 representing an entity, and similarly from or to one of the supplier computers 122 representing an organization and another one of the supplier computers 122 representing an entity. The server 102 is programmed to also store such transactional data in association with the appropriate accounts in a storage device, such as in the data repository 140. The server 102 is programmed to further receive additional data from the data source computers 132 that can be used to assess the transactional data communicated between the supplier computers 122 and the buyer computers 112. The additional data may include industry-wide prices of certain items sold by a supplier account or annual revenue or spending data associated with a buyer account. The server 102 is programmed to also store such additional data in a storage device, such as the data repository 140.

Embodiments may be implemented as executable program instructions that are integrated into an e-procurement service which can intake transaction data from issuing entities and securely utilize that data to assess project risk, which may be indicative of fraud or other undesirable or unintentional actions, and to utilize risk assessment to actively, and in-real time, manage procurements and transactions. In an embodiment, e-procurement processes are improved via the integration, by utilizing a central service structure, e.g., the server 102, to implement the risk assessment techniques. This centralization of risk assessment functions by the server 102 allows data to be sent and stored in a minimal and efficient manner, which further allows critical resources to be better utilized while improving service security.

Furthermore, the embodiments described herein improve security interactions associated with the e-procurement service by enabling the central service structure to responsively act, in-real time and automatically, when abnormal or risky activity is identified. Automatic detection and resolution of risk issues also removes intensive and inefficient obsolete processes which were used to manually identify and address risk, often reactively rather than proactively. Automatic detection allows minimal computing resources to be used to solve a problem in the most efficient and responsive manner possible.

To illustrate clear examples, the subsequent figures discussed herein, and certain other diagrams are discussed in the context of FIG. 1, but other embodiments could be performed using arrangements other than as shown in FIG. 1. Each process diagram or flow diagram herein is intended as a plan, algorithm, or specification for programming one or more computer programs or other software elements to implement the functions that are represented in the diagrams, and is expressed at the same level of detail as customarily used by persons having ordinary skill in the art to which this disclosure pertains to communicate among themselves about software architecture and program flow at development stages before actual coding is undertaken. Furthermore, all functional statements in the description of the figures discussed herein are intended to describe programmed, executable machine operations of one or more of the elements of FIG. 1, unless the context indicates otherwise; that is, the disclosure is directed to particular machines programmed to execute in a particular way to execute or implement the specified functions, and/or digital storage media recorded with executable instructions that can be loaded and executed in a machine to perform the specified functions, and their practical applications, and is not directed to ideas in the abstract, concepts or functions alone.

3. Example Processes for Assessing Risk in E-Procurement Transactions

Figure 2:
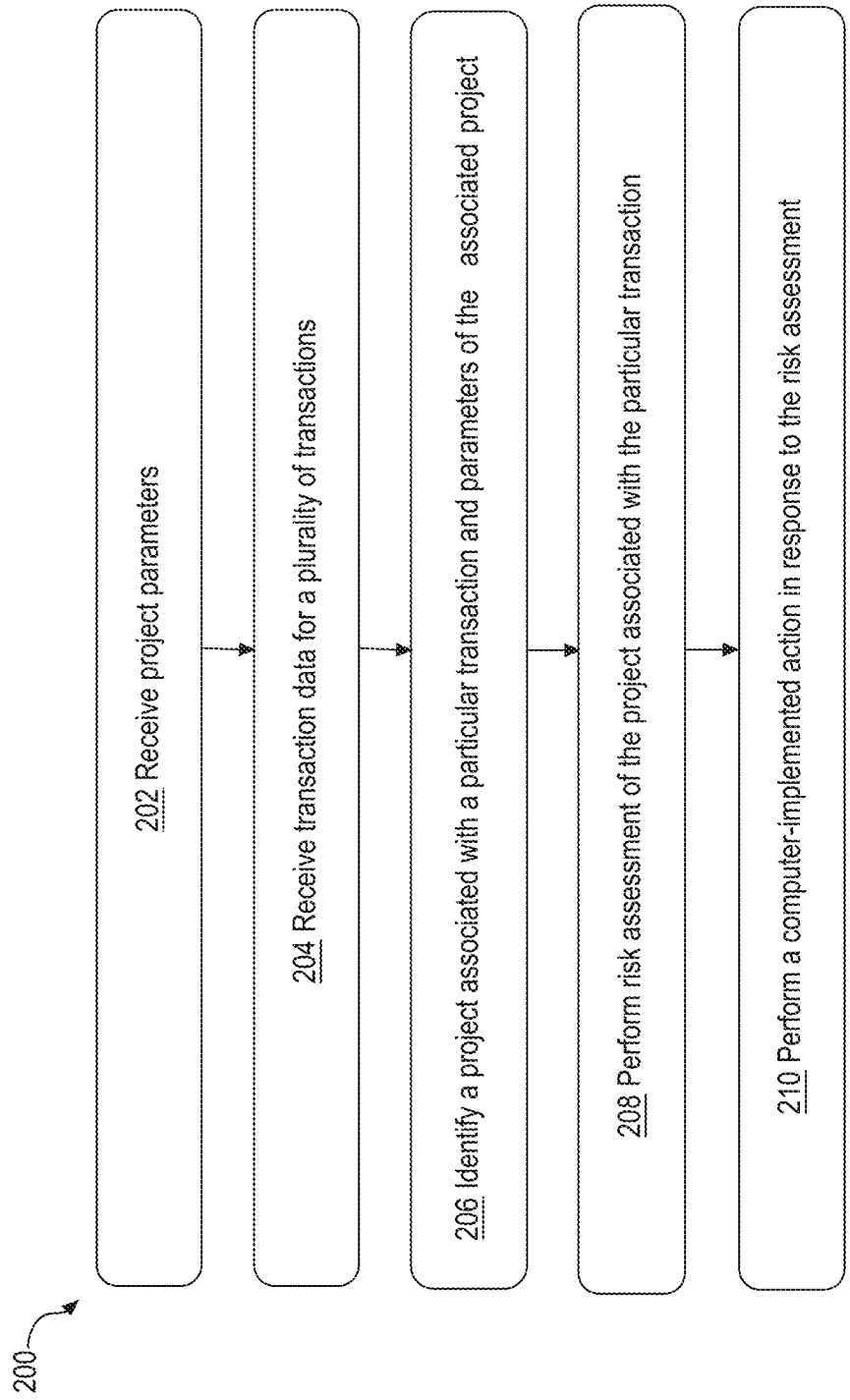
FIG. 2 is a flowchart of a process that may be programmed for evaluating transactions and assessing risk according to an embodiment.

FIG. 2 is a flowchart for evaluating transactions and assessing risk according to an embodiment. The example process flowchart 200 depicted in FIG. 2 may be executed using programmed sequences of instructions via a networked computer system, such as the system of FIG. 1 including the server computer 102 and/by computer system 300 of FIG. 3, which include a software system, such as the software system 400 of FIG. 4. The system, server, and/or other computing device is configured for facilitating procurement transactions between a buyer account and a supplier account, receiving parameters defining a scope of respective projects, receiving transaction data for transactions in real-time, assessing risk based on transaction data and project parameters, and controlling computer-implemented actions based on the risk assessment.

FIG. 2 and each other flow diagram herein is intended as an illustration at the functional level at which skilled persons, in the art to which this disclosure pertains, communicate with one another to describe and implement algorithms using programming. The flow diagrams are not intended to illustrate every instruction, method object or sub-step that would be needed to program every aspect of a working program, but are provided at the same functional level of illustration that is normally used at the high level of skill in this art to communicate the basis of developing working programs.

Although blocks 202-210 are illustrated in an example order, the blocks may also be performed in parallel, and/or in a different order than described herein. Flowchart 200 may also include additional or fewer blocks, as needed or desired. For example, blocks 202-210 can be combined into fewer blocks, divided into additional blocks, and/or removed based upon a desired implementation.

At block 202, a computing device receives project parameters, which may include a unique project identifier for use with associated transactions and one or more other attributes or values associated with the project. A project could define a sourcing event, or limits or thresholds for transactions relating to the project. The project parameters can define a scope of a project, for instance, a list of authorized suppliers, characteristics of authorized suppliers, definitions of private information, identification of private information, rules on sharing or accessing private information, spend parameters related to authorized monetary amounts and/or authorized quantities of goods and/or services, delivery or other timelines or due dates, and the like. The project parameters may further include subsets of parameters for different buyer accounts, supplier accounts, payment accounts (e.g., credit cards or bank accounts), and the like. For instance, one buyer account or payment account may have a certain spend limit that is different from a spend limit for another buyer or payment account. In an embodiment, an e-procurement system is configured to provide a GUI to a user computer, e.g., a buyer computer 112. A user may utilize the GUI to provide and/or edit project parameters as desired or needed. The e-procurement system is configured to store the project parameters in a database, such as the data repository 140 of FIG. 1.

At block 204, the computing device receives transaction data in real-time as each transaction passes through the e-procurement system, which may happen, for instance, when a transaction is created, edited, processed, authorized, invoiced, paid, and/or completed. The transaction data relates to transactions, such as requisitions, purchase orders, sourcing events, invoices, and the like, which are managed by the e-procurement system. The transaction data may include, for example, an associated project identifier, buyer entity information, supplier entity information, details on goods and/or services, information on quantities and prices, delivery timeframes, and the like. Block 204 can be implemented by programming the e-procurement service to invoke a method, function, or other program instructions that implement block 204 in response to the creation of a new transaction, document, or form in the e-procurement system; for example, a database trigger could be programmed in the e-procurement database to call the method of FIG. 2 in response to the creation of new rows that represent requisitions, purchase orders, sourcing events, invoices, and the like.

At block 206, the computing device uses transaction data for a particular transaction to identify a project associated with the transaction. In an example, the transaction data includes a unique project identifier that is used to identify the associated project and block 206 can comprise reading or extracting the project identifier from the transaction data, then transmitting a query to the project database, using the project identifier as a key value, to receive project parameters for the identified project associated with the transaction.

At block 208, the computing device performs a risk assessment of the project associated with the transaction. In an example, the computing device uses the transaction data for the particular transaction and the project parameters to execute a risk assessment algorithm or instructions that implement a plurality of risk assessment tests and output or yield a risk score or risk value. Generally, at block 208, the computing device analyzes a transaction in view of associated project parameters to determine whether proceeding with the transaction will violate a defined scope of the project.

In an example, the risk assessment at block 208 includes at least one of updating a cumulative spend amount of the associated project based on a particular spend amount of the particular transaction, or updating a cumulative quantity of a good or service of the associated project based on a particular quantity of a good or service of the particular transaction, then testing whether any of the project parameters are violated by executing the transaction. In this example, the computing device performs the risk assessment by comparing the updated cumulative spend amount or updated cumulative quantity of a good or service to an authorized spend amount or authorized quantity of a good or service, respectively, for the associated project and testing whether the cumulative spend amount approaches or exceeds a threshold or limit that has been stored in the project parameters.

In another example, the risk assessment at block 208 includes determining that the particular transaction shares or otherwise accesses customer data or other private data, such as a customer's or individual's name, address, birthday, or other identifying information, payment account information, and the like. For example, the risk assessment of block 208 may be programmed to inspect data values in the transaction that must be updated to execute the transaction, and to query metadata of the database to determine whether the corresponding columns of a record in the database, which would be updated in executing the transaction, have been tagged as personally identifying information (PII). In this example, the computing device is configured to determine a violation of project parameters of the associated project based on the sharing of private data or updating PII in the database.

In an example, the risk assessment at block 208 includes identifying other anomalies from historic or expected project parameters, such as an unusually large number or cost for certain items or services, or a particularly long delivery estimate. "Unusually large" or "particularly long" may be implemented by programming the instructions to implement FIG. 2 to retrieve project parameters representing costs, times, dates, or schedule information and determine whether transaction values exceed the project parameters by a specified, configured threshold or value, such as 5%, 10%, 25%, etc.

In a further example, the risk assessment at block 208 includes determining a scale or scope of a violation or potential violation of project parameters. For instance, the computing device may determine that an actual spend amount is approaching a spend limit and/or has exceeded the spend limit. Or, block 208 may be programmed to determine that a scale or scope violation is triggered when cumulative spending is equal to or greater than $1 million or some other spend limit.

At block 210, the computing device performs a computer-implemented action in response to the risk assessment of block 208. The action may include, for instance, creating an actionable flag in the e-procurement database for a transaction, notifying an associated account of the actionable flag, entering the transaction into a new or different approval chain to cause review by one or more supervisory accounts, and/or performing a gating control. More particularly, the computer-implemented action may include one or more of generating a digital alert to a buyer and/or supplier account, preventing completion of a transaction or otherwise placing a hold on the transaction, placing a hold on the transaction pending further risk evaluation, preventing access to private data, anonymizing private data and allowing a particular transaction to proceed, or creating a hold on a project to prevent completion of one or other transactions associated with the project. The computing device may select and perform a particular action based on a scale or scope of a violation or potential violation of project parameters. All such actions are implemented programmatically by setting values in database records, instantiating and transmitting notifications via program calls, instantiating and transmitting email messages as alerts or notifications, or calling a method, function, or service of the e-procurement system to change the state of a transaction.

Additionally or alternatively, the computer-implemented method of FIG. 2 could be programmed as a computer-implemented method executed using an e-procurement server computer that is communicatively coupled to a project database, a transaction database, a plurality of buyer computers and a plurality of seller computers via a network, the method comprising: programmatically accessing the project database, the project database having been loaded with a plurality of records, each of the records comprising a project identifier configured as a key value and specifying a plurality of project parameters, the project parameters specifying use of or access to customer data or other private information, spend parameters related to authorized monetary amounts and/or authorized quantities of goods and/or services, timing requirements for delivery of goods or performance of services; obtaining, from the transaction database, transaction data for a plurality of e-procurement transactions in real time as the transaction data is entered in the transaction database during transactions between the buyer computers and the supplier computers; identifying, from transaction data for a particular transaction of the plurality of transactions, a particular project identifier of an associated project of the particular transaction; querying the database using the particular project identifier and retrieving, from a particular record among the plurality of records of the database having a key value matching the particular project identifier, a plurality of particular project parameters of the associated project; performing, based on the transaction data for the particular transaction and the plurality of project parameters of the associated project, a risk assessment of the associated project of the particular transaction; performing an action in response to the risk assessment, the action comprising at least one of: generating a digital alert to a buyer and/or supplier account; preventing completion of the particular transaction; preventing access to private data; anonymizing private data; or creating a hold on the associated project to prevent completion of one or other associated transactions.

In one implementation, the particular project may be a sourcing event being defined by buyer entity, a start date, an end date, one or more commodities, and one or more points of delivery of the commodities. In another implementation, the method may further comprise executing at least one of: updating a cumulative spend amount of the associated project based on a particular spend amount of the particular transaction, or updating a cumulative quantity of a good or service of the associated project based on a particular quantity of a good or service of the particular transaction; and the performing the risk assessment may further comprise comparing the updated cumulative spend amount or updated cumulative quantity of a good or service to an authorized spend amount or authorized quantity of a good or service, respectively, for the associated project.

In yet another implementation, performing the risk assessment may comprise determining that the particular transaction shares private data; determining a violation of project parameters of the associated project based on the sharing of private data. In any of the foregoing implementations, the process may be programmed for identifying the associated project and project parameters and performing the risk assessment in real-time as the transaction data is received.

Additional examples may include:

1. A computer-implemented method, comprising receiving transaction data for a plurality of transactions; identifying, from transaction data for a particular transaction of the plurality of transactions, an associated project of the particular transaction and project parameters of the associated project; performing, based on the transaction data for the particular transaction and the project parameters of the associated project, a risk assessment of the associated project of the particular transaction; performing an action in response to the risk assessment, the action comprising at least one of: generating a digital alert to a buyer and/or supplier account; preventing completion of the particular transaction; preventing access to private data; anonymizing private data; or creating a hold on the associated project to prevent completion of one or other associated transactions.

2. The method of example 1, further comprising at least one of updating a cumulative spend amount of the associated project based on a particular spend amount of the particular transaction, or updating a cumulative quantity of a good or service of the associated project based on a particular quantity of a good or service of the particular transaction; wherein the performing the risk assessment further comprising comparing the updated cumulative spend amount or updated cumulative quantity of a good or service to an authorized spend amount or authorized quantity of a good or service, respectively, for the associated project.

3. The method of example 1, wherein the performing the risk assessment further comprising: determining that the particular transaction shares private data; determining a violation of project parameters of the associated project based on the sharing of private data.

4. The method of example 1, wherein the identifying the associated project and project parameters, and the performing the risk assessment are performed in real-time as the transaction data is received.

5. The method of example 1, wherein the transaction data for each of the plurality of transactions includes a project identifier of an associated project.

6. One or more non-transitory computer-readable storage medium storing instructions that, when executed by one or more processors, cause the one or more processors to perform functions of examples 1-5.

7. A system comprising: one or more processors; and one or more storage non-transitory computer-readable storage medium storing instructions that, when executed by the one or more processors, cause the one or more processors to perform functions of examples 1-5.

4. Hardware and Software Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 3:
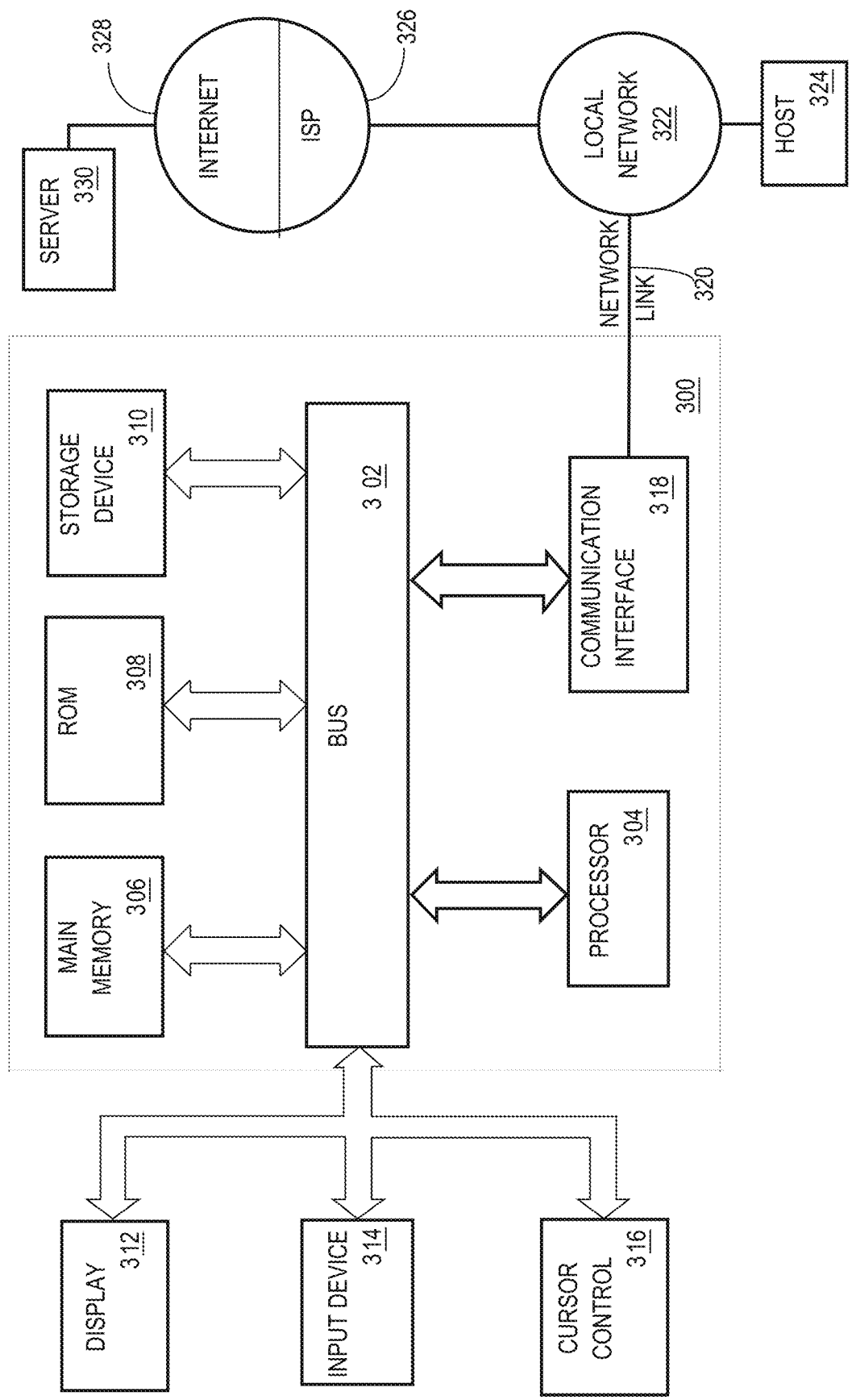
FIG. 3 is a block diagram of a computing device that may be used to implement an embodiment.

For example, FIG. 3 is a block diagram that illustrates a computer system 300 upon which an embodiment may be implemented. Computer system 300 includes a bus 302 or other communication mechanism for communicating information, and a hardware processor 304 coupled with bus 302 for processing information. Hardware processor 304 may be, for example, a general-purpose microprocessor.

Computer system 300 also includes a main memory 306, such as a random-access memory (RAM) or other dynamic storage device, coupled to bus 302 for storing information and instructions to be executed by processor 304. Main memory 306 also may be used for storing temporary variables or other intermediate information during execution of instructions to be executed by processor 304. Such instructions, when stored in non-transitory storage media accessible to processor 304, render computer system 300 into a special-purpose machine that is customized to perform the operations specified in the instructions.

Computer system 300 further includes a read only memory (ROM) 308 or other static storage device coupled to bus 302 for storing static information and instructions for processor 304. A storage device 310, such as a magnetic disk, optical disk, or solid-state drive is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

Computer system 300 may implement the techniques described herein using customized hard-wired logic, one or more ASICs or FPGAs, firmware and/or program logic which in combination with the computer system causes or programs computer system 300 to be a special-purpose machine. According to one embodiment, the techniques herein are performed by computer system 300 in response to processor 304 executing one or more sequences of one or more instructions contained in main memory 306. Such instructions may be read into main memory 306 from another storage medium, such as storage device 310. Execution of the sequences of instructions contained in main memory 306 causes processor 304 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 310. Non-volatile media may also include persistent memory, such as MRAM or PCM, like 3DXPoint from Intel which can be used as a part of main memory. Volatile media includes dynamic memory, such as main memory 306. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 302. Transmission media can also take the form of acoustic or light waves, such as those generated during radio-wave and infra-red data communications.

Various forms of media may be involved in carrying one or more sequences of one or more instructions to processor 304 for execution. For example, the instructions may initially be carried on a magnetic disk or solid-state drive of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card, cable modem, satellite modem, or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic, or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the worldwide packet data communication network now commonly referred to as the "Internet" 328. Local network 322 and Internet 328 both use electrical, electromagnetic, or optical signals that carry digital data streams. The signals through the various networks and the signals on network link 320 and through communication interface 318, which carry the digital data to and from computer system 300, are example forms of transmission media.

Computer system 300 can send messages and receive data, including program code, through the network(s), network link 320 and communication interface 318. In the Internet example, a server 930 might transmit a requested code for an application program through Internet 328, ISP 326, local network 322 and communication interface 318.

The received code may be executed by processor 304 as it is received, and/or stored in storage device 310, or other non-volatile storage for later execution.

Figure 4:
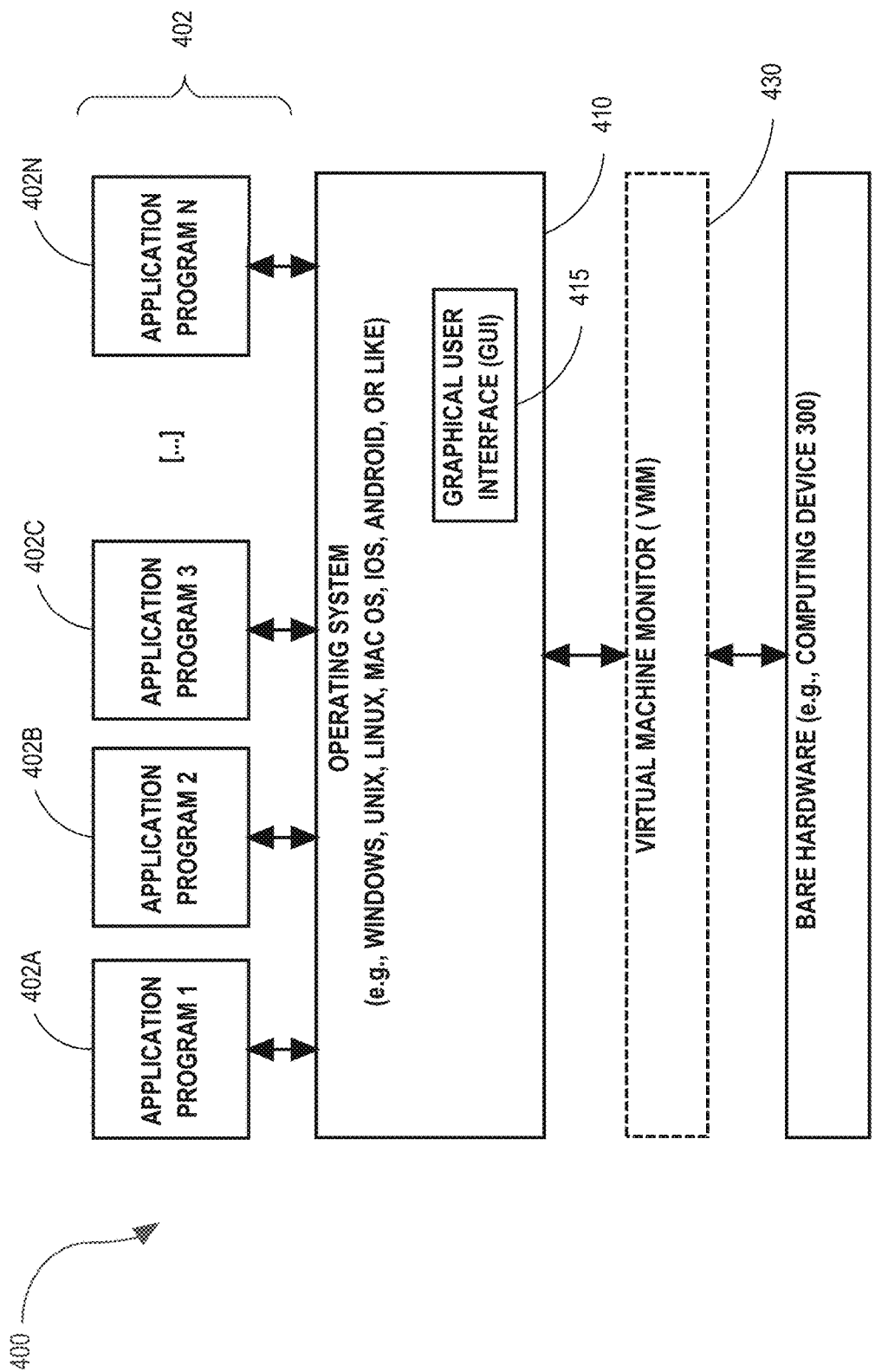
FIG. 4 is a block diagram of a software system for controlling the operation of the computing device of FIG. 3.

FIG. 4 is a block diagram of a software system 400 that may be employed for controlling the operation of computer system 400. Software system 400 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 400 is provided for directing the operation of computer system 500. Software system 400, which may be stored in system memory (RAM) and on fixed storage (e.g., hard disk or flash memory) 310, includes a kernel or operating system (OS) 410.

The OS 410 manages low-level aspects of computer operation, including managing execution of processes, memory allocation, file input and output (I/O), and device I/O. One or more application programs, represented as element 402A, 402B, 402C . . . 402N, may be "loaded" (e.g., transferred from fixed storage into memory) for execution by the system. The applications or other software intended for use on system 400 may also be stored as a set of downloadable computer-executable instructions, for example, for downloading and installation from an Internet location (e.g., a Web server, an app store, or other online service).

Software system 400 includes a graphical user interface (GUI) 415, for receiving user commands and data in a graphical (e.g., "point-and-click" or "touch gesture") fashion. These inputs, in turn, may be acted upon by the system 300 in accordance with instructions from operating system 410 and/or application(s) 402. The GUI 415 also serves to display the results of operation from the OS 410 and application(s) 402, whereupon the user may supply additional inputs or terminate the session (e.g., log off).

OS 410 can execute directly on bare hardware (e.g., processor(s)) utilizing system 400. Alternatively, a hypervisor or virtual machine monitor (VMM) 430 may be interposed between the bare hardware and the OS 410. In this configuration, VMM 430 acts as a software "cushion" or virtualization layer between the OS 410 and the bare hardware of the system.

VMM 430 instantiates and runs one or more virtual machine instances ("guest machines"). Each guest machine comprises a "guest" operating system, such as OS 410, and one or more applications, such as application(s) 402, designed to execute on the guest operating system. The VMM 430 presents the guest operating systems with a virtual operating platform and manages the execution of the guest operating systems.

In some instances, the VMM 430 may allow a guest operating system to run as if it is running on the bare hardware of a system directly. In these instances, the same version of the guest operating system configured to execute on the bare hardware directly may also execute on VMM 430 without modification or reconfiguration. In other words, VMM 430 may provide full hardware and CPU virtualization to a guest operating system in some instances.

In other instances, a guest operating system may be specially designed or configured to execute on VMM 430 for efficiency. In these instances, the guest operating system is "aware" that it executes on a virtual machine monitor. In other words, VMM 430 may provide para-virtualization to a guest operating system in some instances.

The above-described basic computer hardware and software is presented for the purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprises two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure, applications, and servers, including one or more database servers.

5. General Considerations

To illustrate clear examples of implementations using computers, this disclosure refers to accounts, payments, and certain functions using them; the nature of writing computer programs, and the ordinary manner in which skilled software engineers communicate with one another, mandates the use of a description that is at least partly functional. However, the disclosure is directed to computer-implemented processes and functions in which one or more elements of a distributed computer system execute stored control programs to perform the functions that are described. Functions described in the disclosure are computer-implemented functions to be implemented in practice using digitally stored programs executing on computers, or other machines, or stored in non-transitory computer-readable media, to provide the technical solutions that are disclosed. Descriptions of functional units and their functions cover technical solutions to specified or otherwise understood technical problems.

In the foregoing specification, embodiments of the disclosure have been described with reference to numerous specific details that may vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction.

As used in this disclosure the terms "include" and "comprise" (and variations of those terms, such as "including," "includes," "comprising," "comprises," "comprised" and the like) are intended to be inclusive and are not intended to exclude further features, components, integers or steps.

References in this document to "an embodiment," etc., indicate that the embodiment described or illustrated may include a particular feature, structure, or characteristic, but every embodiment may not necessarily include the particular feature, structure, or characteristic. Such phrases are not necessarily referring to the same embodiment. Further, when a particular feature, structure, or characteristic is described or illustrated in connection with an embodiment, it is believed to be within the knowledge of one skilled in the art to effect such feature, structure, or characteristic in connection with other embodiments whether or not explicitly indicated.

Various features of the disclosure have been described using process steps. The functionality/processing of a given process step could potentially be performed in different ways and by different systems or system modules. Furthermore, a given process step could be divided into multiple steps and/or multiple steps could be combined into a single step. Furthermore, the order of the steps can be changed without departing from the scope of the present disclosure.

It will be understood that the embodiments disclosed and defined in this specification extend to alternative combinations of the individual features and components mentioned or evident from the text or drawings. These different combinations constitute various alternative aspects of the embodiments.

In the foregoing specification, embodiments of the disclosure have been described with reference to numerous specific details that may vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction.

What is claimed is:

1. A computer-implemented method executed using an e-procurement server computer that is communicatively coupled to a project database, a transaction database, a plurality of buyer computers and a plurality of seller supplier computers via a network, the e-procurement server computer comprising one or more processors and one or more non-transitory computer-readable storage media storing one or more sequences of instructions organized as a risk assessment layer that is configured for evaluating during a plurality of e-procurement transactions between buyer accounts and supplier accounts in real-time, identifying and evaluating violations of project parameters, and determining a scale of violation of the project parameters or executing precautionary or remedial measures for the scale of a violation of the project parameters, the method comprising:

programmatically accessing the project database by querying using structured query language (SQL) queries, the project database having been loaded with a plurality of records, each of the records comprising a project identifier configured as a key value and specifying a plurality of project parameters associated with a particular project, the project parameters specifying use of or access to customer data or other private information, spend parameters related to authorized monetary amounts or authorized quantities of goods or services, timing requirements for delivery of goods or performance of services associated with the particular project;

obtaining, from the transaction database, transaction data for the plurality of e-procurement transactions in real time as the transaction data is entered in the transaction database during transactions between the buyer computers and the supplier computers;

identifying, from the transaction data for a particular transaction of the plurality of transactions, a particular project identifier of the particular project of the particular transaction;

querying the project database using the particular project identifier and retrieving, from a particular record among the plurality of records of the project database having a database key value matching the key value of the particular project identifier, a plurality of particular project parameters of the associated particular project;

performing by periodically executing a cron job, based on the transaction data for the particular transaction and the plurality of project parameters of the associated particular project, a risk assessment of the associated particular project of the particular transaction by updating a cumulative spend amount of the associated particular project based on a particular spend amount of the particular transaction and comparing the updated cumulative spend amount with an authorized spend amount for the associated particular project to determine whether the cumulative spend amount exceeds a threshold spend amount associated with the plurality of particular project parameters by a predetermined percentage of the authorized spend amount;

determining the scale of violation of the particular project parameters of the associated particular project when the cumulative spend amount exceeds the threshold spend amount by the predetermined percentage of the authorized spend amount, wherein an actionable flag is created for the associated particular project;

determining, from the actionable flag, a particular action corresponding to the scale of the violation;

performing, based on the scale of the violation, the particular action in response to the risk assessment, the particular action comprising entering the particular transaction in a new approval chain for individual accounts associated with the particular project to change state of the particular transaction.

2. The computer-implemented method of claim 1, the particular project comprising a sourcing event being defined by a buyer entity, a start date, an end date, one or more commodities, and one or more points of delivery of the commodities.

3. The method of claim 1, further comprising:

executing updating a cumulative quantity of a good or service of the associated particular project based on a particular quantity of a good or service of the particular transaction; and the performing of the risk assessment further comprising comparing the updated cumulative quantity of a good or service to an authorized quantity of a good or service for the associated particular project.

4. The method of claim 1, the performing of the risk assessment further comprising:

determining that the particular transaction shares private data or personally identifying information (PII);

determining a violation of the project parameters of the associated particular project based on the sharing of the private data or updating the PII.

5. The method of claim 1, further comprising identifying the associated particular project and project parameters, and performing the risk assessment in real-time as the transaction data is received.

6. One or more non-transitory computer-readable storage media storing instructions that, when executed by one or more processors, cause the one or more processors to execute:

using an e-procurement server computer that is communicatively coupled to a project database, a transaction database, a plurality of buyer computers and a plurality of seller supplier computers via a network, the e-procurement server computer comprising one or more processors and one or more non-transitory computer-readable storage media storing one or more sequences of instructions organized as a risk assessment layer that is configured for evaluating during a plurality of e-procurement transactions between buyer accounts and supplier accounts in real-time, identifying and evaluating violations of project parameters, and determining a scale of violation of the project parameters or executing precautionary or remedial measures for the scale of a violation of the project parameters;

programmatically accessing the project database by querying using structured query language (SQL) queries, the project database having been loaded with a plurality of records, each of the records comprising a project identifier configured as a key value and specifying a plurality of project parameters associated with a particular project, the project parameters specifying a use of or access to customer data or other private information, spend parameters related to authorized monetary amounts or authorized quantities of goods or services, timing requirements for delivery of goods or performance of services associated with the particular project;

obtaining, from the transaction database, transaction data for the plurality of e-procurement transactions in real time as the transaction data is entered in the transaction database during transactions between the buyer computers and the supplier computers;

identifying, from the transaction data for a particular transaction of the plurality of transactions, a particular project identifier of the particular project of the particular transaction;

querying the project database using the particular project identifier and retrieving, from a particular record among the plurality of records of the project database having a database key value matching the key value of the particular project identifier, a plurality of particular project parameters of the associated particular project;

performing by periodically executing a cron job, based on the transaction data for the particular transaction and the plurality of project parameters of the associated particular project, a risk assessment of the associated particular project of the particular transaction by updating a cumulative spend amount of the associated particular project based on a particular spend amount of the particular transaction and comparing the updated cumulative spend amount with an authorized spend amount for the associated particular project to determine whether the cumulative spend amount exceeds a threshold spend amount associated with the plurality of particular project parameters by a predetermined percentage of the authorized spend amount;

determining the scale of violation of the particular project parameters of the associated particular project when the cumulative spend amount exceeds the threshold spend amount by the predetermined percentage of the authorized spend amount, wherein an actionable flag is created for the associated particular project;

determining, from the actionable flag, a particular action corresponding to the scale of the violation;

performing, based on the scale of the violation, the particular action in response to the risk assessment, the particular action comprising entering the particular transaction in a new approval chain for individual accounts associated with the particular project to change state of the particular transaction.

7. The storage media of claim 6, the particular project comprising a sourcing event being defined by buyer entity, a start date, an end date, one or more commodities, and one or more points of delivery of the commodities.

8. The storage media of claim 6, further comprising sequences of instructions which when executed using the one or more processors cause:

executing updating a cumulative quantity of a good or service of the associated particular project based on a particular quantity of a good or service of the particular transaction; and the performing of the risk assessment further comprising comparing the updated cumulative quantity of a good or service to an authorized quantity of a good or service for the associated particular project.

9. The storage media of claim 6, further comprising sequences of instructions which when executed using the one or more processors cause performing of the risk assessment by determining that the particular transaction shares private data or personally identifying information (PII); determining a violation of the project parameters of the associated particular project based on the sharing of the private data or updating the PII.

10. The storage media of claim 6, further comprising sequences of instructions which when executed using the one or more processors cause performing identifying the associated particular project and project parameters and performing the risk assessment in real-time as the transaction data is received.

* * * * *